United States Patent
Lee

(10) Patent No.: US 8,436,498 B2
(45) Date of Patent: May 7, 2013

(54) STEPPING MOTOR

(75) Inventor: Hong Kon Lee, Gyeonggi-do (KR)

(73) Assignee: LG Innotek Co., Ltd., Seoul (KR)

( * ) Notice: Subject to any disclaimer, the term of this patent is extended or adjusted under 35 U.S.C. 154(b) by 217 days.

(21) Appl. No.: 13/122,006

(22) PCT Filed: Sep. 16, 2009

(86) PCT No.: PCT/KR2009/005268
§ 371 (c)(1),
(2), (4) Date: Mar. 31, 2011

(87) PCT Pub. No.: WO2010/041828
PCT Pub. Date: Apr. 15, 2010

(65) Prior Publication Data
US 2011/0181134 A1  Jul. 28, 2011

(30) Foreign Application Priority Data
Oct. 6, 2008  (KR) ........................ 10-2008-0097689

(51) Int. Cl.
*H02K 37/00* (2006.01)
(52) U.S. Cl.
USPC ..................................... 310/49.18; 310/49.01
(58) Field of Classification Search .... 310/49.01–49.55, 310/89, 91
See application file for complete search history.

(56) References Cited

U.S. PATENT DOCUMENTS

| | | | | |
|---|---|---|---|---|
| 5,225,941 A * | 7/1993 | Saito et al. | ..................... | 359/824 |
| 5,575,235 A * | 11/1996 | Nakagawa et al. | ........... | 116/286 |
| 5,689,994 A * | 11/1997 | Nagai et al. | ................... | 74/89.32 |
| 6,541,886 B2 * | 4/2003 | Mayumi | ........................ | 310/91 |
| 7,210,665 B2 * | 5/2007 | Suzuki | ............................. | 251/69 |
| 7,667,361 B2 * | 2/2010 | Nobe et al. | ...................... | 310/90 |
| 8,161,844 B2 * | 4/2012 | Shiga | ............................. | 74/841 |
| 2007/0222329 A1 * | 9/2007 | Bin | ............................... | 310/257 |
| 2007/0296294 A1 * | 12/2007 | Nobe et al. | ...................... | 310/90 |

FOREIGN PATENT DOCUMENTS

| | | |
|---|---|---|
| KR | 10-2003-0094637 A | 12/2003 |
| KR | 10-0511696 B1 | 8/2005 |
| KR | 10-2008-0066491 A | 7/2008 |

* cited by examiner

*Primary Examiner* — Thanh Lam
(74) *Attorney, Agent, or Firm* — Saliwanchik, Lloyd & Eisenschenk

(57) ABSTRACT

Disclosed is a stepping motor in which the rim of a substrate and the lower surface of the substrate directed toward the outside of a bracket are arranged inside of the bracket to prevent the rim and lower surface of the substrate from projecting outwardly. Accordingly, the substrate is prevented from colliding against an object during a falling impact test, thus preventing damage to the substrate and improving the durability and reliability of the stepping motor. Further, the substrate gets caught by a hook of the bracket when the substrate is pressed toward the bracket when the substrate is located at a predetermined point of the bracket. This leads to a simplified assembly process and improved productivity.

16 Claims, 3 Drawing Sheets

STEPPING MOTOR

CROSS-REFERENCE TO RELATED APPLICATIONS

This application is the U.S. national stage application of International Patent Application No. PCT/KR2009/005268, filed Sep. 16, 2009, which claims priority to Korean Application No. 10-2008-0097689, filed Oct. 6, 2008, the disclosures of each of which are incorporated herein by reference in their entirety.

TECHNICAL FIELD

The present invention relates to a stepping motor.

BACKGROUND ART

A stepping motor is used to precisely control a mechanical movement amount and can be digitally controlled by pulses. Due to this fact, the stepping motor is used to adjust the direction or the angle of a to lamp of a vehicle which requires precise control or for an optical pickup of an optical disc driver.

A substrate is coupled to a bracket of the stepping motor. The substrate is electrically connected with coils of a stator and an external power source and controls the stepping motor in response to a command from a main substrate of a product.

In a conventional stepping motor, the rim and the lower surface of a substrate, which is coupled to a bracket, project out of the bracket and thus cannot be protected by the bracket. As a consequence, when performing a falling impact test, the substrate directly collides against a floor, etc. Since a plurality of electric and electronic devices are installed on the substrate, the substrate is likely to be damaged. Hence, disadvantages are caused in that the durability and the reliability of the stepping motor deteriorate.

Meanwhile, with the substrate held at a predetermined position on the bracket, the ends of the bracket are heat-fused so as to couple the substrate to the bracket. Thus, an assembly process is complicated and productivity deteriorates.

DISCLOSURE

Technical Problem

Accordingly, the present invention has been made in an effort to solve the problems occurring in the related art, and an object of the present invention is to provide a stepping motor which can improve durability and reliability.

Another object of the present invention is to provide a stepping motor which can improve productivity.

Technical Solution

In order to achieve the above objects, according to one aspect of the present invention, there is provided a stepping motor including a bracket; a stator inserted into and coupled to one end of the bracket; a thrust plate coupled to the stator and inserted into the one end of the bracket; a lead screw having one end which is supported by the thrust plate and the other end which is supported by the other end of the bracket and installed to be capable of forward and backward rotations; a rotator coupled to the lead screw and rotated in cooperation with the stator to rotate the lead screw; a substrate coupled to the bracket in such a manner that a rim of the substrate and a surface of the substrate facing an outside of the bracket are arranged inside the bracket, and electrically connected with the stator and an external power source; and a cover coupled to the one end of the bracket to prevent the thrust plate from being released from the bracket and enclose and protect one end of the substrate.

Advantageous Effects

According to the present invention, in the stepping motor according to the present invention, the rim of a substrate and the lower surface of the substrate directed toward the outside of a bracket are arranged inside the bracket to prevent the rim and the lower surface of the substrate from projecting outwardly. Accordingly, since the substrate is prevented from colliding against an object during a falling impact test, damage to the substrate is prevented. Therefore, the durability and the reliability of the stepping motor are improved. Further, the substrate gets caught by a hook of the bracket when the substrate is pressed toward the bracket in a state in which the substrate is located at a predetermined point of the bracket. This leads to a simplified assembly process and improved productivity.

DESCRIPTION OF DRAWINGS

The above objects, and other features and advantages of the present invention will become more apparent after a reading of the following detailed description taken in conjunction with the drawings, in which.

BEST MODE

Figure 1:
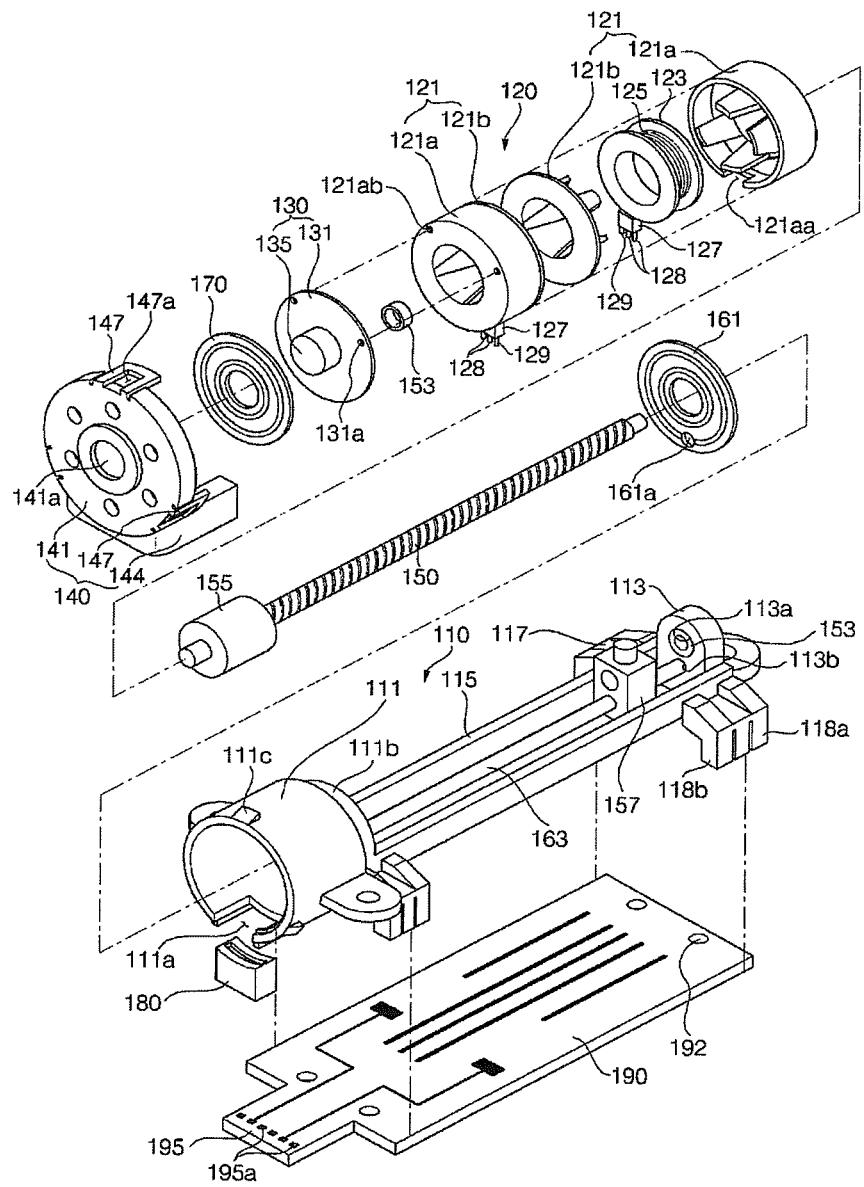
FIG. 1 is an exploded perspective view of a stepping motor in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is an exploded perspective view of a stepping motor in accordance with an embodiment of the present invention.

Referring to FIG. 1, a bracket 10, which is formed through injection molding, is prepared. The bracket 110 has a cylindrical support frame 111 which is opened at both ends thereof, a support plate 113 which is separated from the support frame 111 by a predetermined distance and is opposed to the inner space defined in the support frame 111, connection bars 115 which integrally connect the support frame 111 and the support plate 113, and a plurality of hooks 117 each of which has a predetermined elasticity.

The hooks 117 are oppositely formed on both sides of the support frame 111 and on both sides of the support plate 113, and protect a substrate 190, which will be described later, by being engaged with and coupled to the substrate 190.

A stator 120 is inserted into and coupled to the support frame 111. The stator 120 has housings 121, bobbins 123, coils 125, terminal plates 127, and connection pins 128, and is coaxial to the center of the support frame 111.

Each housing 121 has a case 121a and a yoke 121b which are coupled to each other through welding, etc. The case 121a and the yoke 121b are formed with teeth which are engaged with each other when the case 121a and the yoke 121b are coupled to each other.

The housings 121 are provided in a pair such that their yokes 121b are coupled to each other through welding, etc., and are inserted into and coupled to the support frame 111 to be coaxial to the center of the support frame 111.

The bobbins 123 are provided in a pair, are respectively inserted into and coupled to the housings 121, and are coaxial to the centers of the housings 121. The coils 125 are respectively wound on the outer surfaces of the bobbins 123.

The terminal plates 127 are provided in a pair and are integrally formed with the bobbins 123. After the bobbins 123 are inserted into and coupled to the housings 121, by coupling the housings 121 to each other, the terminal plates 127 are brought into contact with each other and are installed to adjoin each other.

A plurality of connection pins 128 are supported by and project from each of the terminal plates 127. The connection pins 128 are inserted into and connected with connection holes 195a which are defined in a connection piece 195 of the substrate 190. Also, the connection pins 128 are connected with the coils 125. Accordingly, external power is transferred to the coils 125 through the connection pins 128 from the substrate 190.

A ground pin 129 is formed to be supported by each of the terminal plates 127. The ground pin 129 is inserted into and connected with a ground hole 195b which is defined in the connection piece 195 of the substrate 190, and grounds the stepping motor.

The terminal plates 127, the connection pins 128 and the ground pins 129 project out of the housings 121 and the support frame 111 and are exposed to an outside. To this end, through grooves 121as are respectively defined in the cases 121a of the housings 121, and a communicating groove 111a is defined in the support frame 111 to communicate with the through grooves 121aa. That is to say, the terminal plates 127 respectively pass through the through grooves 121as and the communicating groove 111a and are exposed out of the housings 121 and the support frame 111. Therefore, the connection pins 128 and the ground pins 129 are exposed out of the housings 121 and the support frame 111.

Since the terminal plates 127 are respectively inserted into and coupled to the through grooves 121aa, the through grooves 121as function to indicate positions where the bobbins 123 are coupled to the housings 121. Also, since the terminal plates 127 are inserted into and coupled to the communicating groove 111a, the communicating groove 111a functions to indicate a position where the stator 120 is coupled to the support frame 111.

A thrust plate 130 is coupled to the case 121a which is positioned adjacent to one end of the support frame 111. The thrust plate 130 has a ring-shaped coupling plate 131 which is formed to correspond to the case 121a and is coupled to the case 121a, and a support pipe 135 which is formed to project from the inner edge of the coupling plate 131 and supports one end of a lead screw 150 to be described later. The support pipe 135 extends toward the outside of the support frame 111.

After aligning the coupling positions of the coupling plate 131 and the case 121a by inserting jigs (not shown) into marking holes 131a and 121ab which are defined in the coupling plate 131 and the case 121a to correspond to each other, by performing spot welding on the coupling plate 131, the thrust plate 130 is coupled to the housing 121. With the thrust plate 130 coupled to the housing 121, the thrust plate 130 is inserted into and coupled to the support frame 111 together with the housings 121.

The other end of the support frame 111 is formed to have a stepped portion 111b. Because the stator 120 is stopped against the stepped portion 111b and the terminal plates 127 are engaged in the communicating groove 111a, the stator 120 is prevented from being released from the other end of the support frame 111.

Conversely, because the one end of the support frame 111 is formed to define a space corresponding to the stator 120, the stator 120 may be released from the one end of the support frame 111. In order to prevent this situation from occurring, a cover 140 is coupled to the one end of the support frame 111.

The cover 140 has a closing part 141 which has the shape of a substantially cylindrical case and is coupled to and closes the one end of the support frame 111, and a covering part 144 which is integrally formed with the outer surface of the closing part 141 and encloses and protects the connection piece 195 of the substrate 190.

A plurality of coupling arms 147 extend from the outer surface of the closing part 141. Engagement openings 147a are defined in the coupling arms 147, and coupling projections 111c are formed on the circumferential outer surface of the support frame 111 to be inserted into and coupled to the engagement openings 147a. As the coupling projections 111c are inserted into and coupled to the engagement openings 147a, the cover 140 is coupled to the support frame 111.

A support opening 141a is defined through the center portion of the closing part 141 such that the support pipe 135 can be inserted into and supported by the support opening 141a.

A receiving groove 113a is defined in the support plate 113 of the bracket 110 to correspond to the support pipe 135. The one end and the other end of the lead screw 150 are respectively supported by the support pipe 135 and the receiving groove 113a in such a manner that the lead screw 150 is installed to be capable of forward and backward rotations. In order to ensure smooth rotation of the lead screw 150, thrust ball bearings 153 are respectively installed in the support pipe 135 and in the receiving groove 113a to support the one end and the other end of the lead screw 150.

A rotator composed of a magnet 155 is coupled to a portion of the lead screw 150 which is positioned in the stator 120. As current supply to the coils 125 is selectively permitted and interrupted, the magnet 155 cooperates with the stator 120 to rotate forward and backward, thereby rotating the lead screw 150 forward and backward.

A straight motion member 157 is installed on the lead screw 150 which is rotated forward and backward by the stator 120. In other words, the lead screw 150 passes through the straight motion member 157, and the straight motion member 157 linearly reciprocates by the forward and backward rotations of the lead screw 150. A lamp for a vehicle or an optical pickup is coupled to the straight motion member 157.

In order for the straight motion member 157 to move linearly, the straight motion member 157 must not be rotated when the lead screw 150 is rotated. To this end, a support ring 161, which is defined with a first support hole 161a, is coupled to the other end of the support frame 111, and a second support hole 113b is defined in the support plate 113. One end and the other end of a support rail 163 are respectively inserted into and supported by the first support hole 161a and the second support hole 113b. The support rail 163 passes through the straight motion member 157. Due to this fact, the straight motion member 157 is prevented from being rotated.

The lead screw 150 passes through the support ring 161.

An elastic member 170 is disposed between the cover 140 and the thrust plate 130. The elastic member 170 elastically supports the thrust plate 130 toward the support plate 113, thereby permitting a backlash to allow the lead screw 150 to rotate smoothly and at the same time compensating for the assembly tolerances of component elements which are inserted into and coupled to the support frame 111.

A support member 180, into and by which the terminal plates 127, the connection pins 128 and the ground pins 129 are inserted and supported, is coupled to the communicating groove 111a of the support frame 111.

The substrate 190, with which the connection pins 128 are to be electrically connected and the ground pins 129 are to be electrically connected, is coupled to the bracket 110. At this time, the substrate 190 is arranged inside the bracket 110 not to collide against an object when performing a falling impact test for the stepping motor.

A coupling structure of the bracket 110 and the substrate 190 will be described below with reference to FIGS. 1 through 3.

Figure 2:
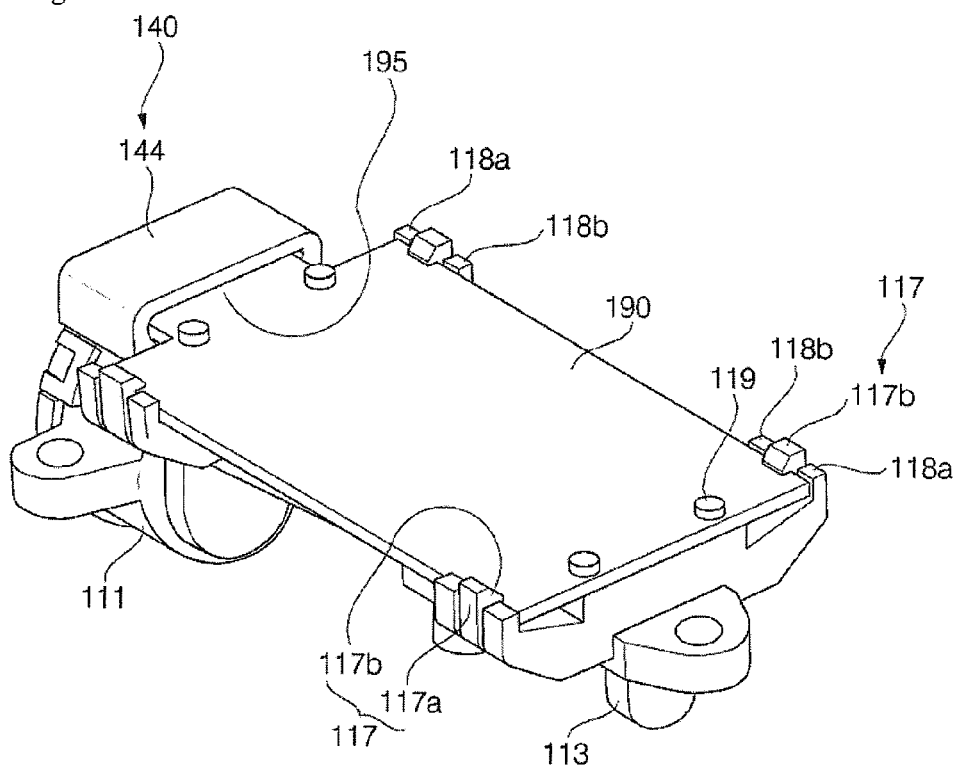
FIG. 2 is a bottom perspective view of the stepping motor with the respective component elements of FIG. 1 assembled.
Figure 3:
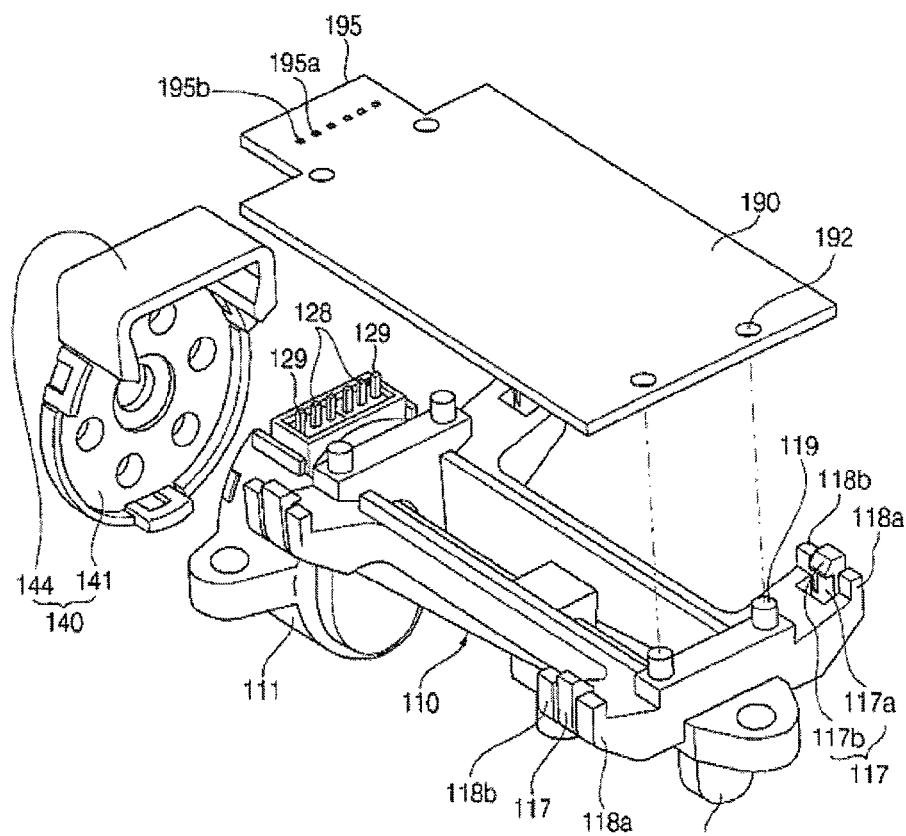
FIG. 3 is a perspective view of the stepping motor with only a substrate, a bracket and a cover disassembled in FIG. 2.

FIG. 2 is a bottom perspective view of the stepping motor with the respective component elements of FIG. 1 assembled, and FIG. 3 is a perspective view of the stepping motor with only a substrate, a bracket and a cover disassembled in FIG. 2.

Referring to FIGS. 2 and 3, the length of the substrate 190 corresponds to a distance from the other end of the support frame 111 to the support plate 113. The connection piece 195 is projectedly formed on the one end of the substrate 190 to be opposed to the terminal plates 127, and the connection holes 195a and the ground holes 195b, into and with which the connection pins 128 and the ground pins 129 are inserted and connected, are defined in the connection piece 195.

A plurality of fluctuation preventing holes 192 are defined through the substrate 190 and a plurality of fluctuation preventing projections 119 are formed on the bracket 110 in such a way as correspond to each other, such that the fluctuation preventing holes 192 and the fluctuation preventing projections 119 indicate positions where the substrate 190 is coupled to the bracket 110 and prevent the substrate 190 coupled to the bracket 110 from fluctuating. By inserting the fluctuation preventing projections 119 into the fluctuation preventing holes 192, the substrate 190 is coupled to the bracket 110 at a predetermined position and is prevented from fluctuating.

After inserting the fluctuation preventing projections 119 into the fluctuation preventing holes 192, the fluctuation preventing projections 119 may be fused.

The hooks 117 of the bracket 110 are formed by four to correspond to ends of one and the other lengthwise sides of the substrate 190 which constitute the corner portions of the substrate 190, and thereby prevent the rim of the substrate 190 and the lower surface of the substrate 190 facing the outside of the bracket 110 from projecting out of the bracket 110.

Namely, the hooks 117 have protecting projections 117a which are formed to correspond to the to ends of the one and the other lengthwise sides of the substrate 190 constituting the corner portions of the substrate 190 and surround and protect the ends of one and the other sides of the substrate 190 which are opposed to each other, and engagement projections 117b which are formed to be bent from the ends of the protecting projections 117a and are engaged with the lower surface of the substrate 190 facing the outside of the bracket 110. As a consequence, since the rim and the lower surface of the substrate 190 do not project out of the bracket 110, when performing the falling impact test, the substrate 190 is prevented from colliding against an object, and instead, the bracket 110 may collide against the object.

The connection piece 195 of the substrate 190 is inserted between the support frame 111 of the bracket 110 and the covering part 144 of the cover 140, and thus, is not exposed to an outside.

First protection rails 118a are formed outside the protecting projections 117a of the respective hooks 117 to be positioned outside the ends of the one and the other lengthwise sides of the substrate 190 which correspond to the corner portions of the substrate 190, thereby further preventing the rim of the substrate 190 from projecting out of the bracket 110. second protection rails 118b are formed inside the protecting projections 117a of the respective hooks 117 to surround and protect the one and the other lengthwise sides of the substrate 190.

The first protection rails 118a are to further prevent the rim of the substrate 190 from projecting out of the bracket 110 and thereby stably protect the substrate 190, and the second protection rails 118b are to increase an area of the sides of the substrate 190 which are surrounded and protected and thereby further stably protect the substrate 190.

In the case where the first protection rails 118a are formed, the protecting projections 117a of the hooks 117 may be positioned inside the ends of the one and the other lengthwise sides of the substrate 190 which correspond to the corner portions of the substrate 190.

The lower ends of the first and second protection rails 118a and 118b project out of the lower surface of the substrate 190, and also prevent the lower surface of the substrate 190 from projecting out of the bracket 110.

In a state in which the lead screw 150, and the stator 120 and the thrust plate 130 coupled to each other are inserted into and coupled to the bracket 110, the support member 180 is coupled to the terminal plates 127. Then, the terminal plates 127, the connection pins 128 and the ground pins 129 are inserted into and protected by the support member 180. In this state, by inserting the fluctuation preventing projections 119 into the fluctuation preventing holes 192 and pressing the substrate 190 against the bracket 110, the substrate 190 is coupled to the bracket 110 by the hooks 117. The connection pins 128 and the ground pins 129 are inserted into and connected with the connection holes 195a and the ground holes 195b of the connection piece 195. Thereafter, the cover 140 is coupled to the support frame 111.

As a result, the rim and the lower surface of the substrate 190 do not project out of the hooks 117 and the first and second protection rails 118a and 118b, and the connection piece 195 of the substrate 190 is covered by the covering part 144 of the cover 140. Accordingly, when performing the falling impact test for the stepping motor, the substrate 190 is prevented from colliding against an object.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:
1. A stepping motor comprising:
a bracket;
a stator inserted into and coupled to one end of the bracket;
a thrust plate coupled to the stator and inserted into the one end of the bracket;
a lead screw having one end which is supported by the thrust plate and the other end which is supported by the other end of the bracket and installed to be capable of forward and backward rotations;
a rotator coupled to the lead screw and rotated in cooperation with the stator to rotate the lead screw;
a substrate coupled to the bracket in such a manner that a rim of the substrate and a surface of the substrate facing an outside of the bracket are arranged inside the bracket, and electrically connected with the stator and an external power source; and a cover coupled to the one end of the bracket to prevent the thrust plate from being released from the bracket and enclose and protect one end of the substrate.

2. The stepping motor according to claim 1, wherein the bracket comprises:
a support frame formed into a cylindrical shape in which both ends are opened, and having the stator and the thrust plate inserted and coupled therein, the cover being coupled to one end of the support frame;
a support plate separated from and opposed to the support frame and supporting the other end of the lead screw;
a connection bar integrally connecting the support frame and the support plate; and
a plurality of elastic hooks shaped to be engaged with and coupled to the substrate and thereby surround and protect corner portions of the substrate and the surface of the substrate facing the outside of the bracket.

3. The stepping motor according to claim 2, wherein the hooks comprise:
protecting projections surrounding and protecting ends of one side and the other side substrate which correspond to the corner portions of the substrate; and
engagement projections formed to be bent from ends of the protecting projections and engaged with the surface of the substrate facing the outside of the bracket.

4. The stepping motor according to claim 3, wherein first protection rails are formed outside the protecting projections of the respective hooks to be positioned outside the ends of the one side and the other side of the substrate which correspond to the corner portions of the substrate and outside the surface of the substrate facing the outside of the bracket and to thereby prevent the rim of the substrate and the surface of the substrate facing the outside of the bracket from projecting out of the bracket.

5. The stepping motor according to claim 4, wherein second protection rails are formed inside the protecting projections of the respective hooks to surround the one side and the other side of the substrate which are opposite to each other and be positioned outside the surface of the substrate facing the outside of the bracket and to thereby prevent the rim of the substrate and the surface of the substrate facing the outside of the bracket from projecting out of the bracket.

6. The stepping motor according to claim 5, wherein the stator comprises:
a housing having a case and a yoke which are coupled to each other, and inserted into and coupled to the support frame, the thrust plate being coupled to the housing;
a bobbin inserted into and coupled to the housing;
a coil wound on the bobbin;
a terminal plate integrally formed with the bobbin and exposed out of the housing and the support frame; and
a plurality of connection pins supported by and projecting from the terminal plate, connected with the coil, and inserted into and connected with the substrate.

7. The stepping motor according to claim 6, wherein the terminal plate is formed with and supports a ground pin.

8. The stepping motor according to claim 7, wherein the housing and the support frame are respectively defined with a through groove and a communicating groove which correspond to each other, and the terminal plate passes through the through groove and the communicating groove and is exposed out of the housing and the support frame.

9. The stepping motor according to claim 8, wherein a support member is coupled to the communicating groove of the support frame in such a manner that the terminal plate, the connection pins and the ground pin are inserted into and supported by the support member.

10. The stepping motor according to claim 9, wherein a connection piece is projectedly formed on the one end of the substrate to face the terminal plate, and is defined with connection holes and a grounding hole into and with which the connection pins and the ground pin are inserted and connected.

11. The stepping motor according to claim 10, wherein the thrust plate comprises:
a ring-shaped coupling plate formed to correspond to the housing, and coupled to the housing; and
a support pipe projectedly formed on an inner edge of the coupling plate and supporting the one end of the lead screw.

12. The stepping motor according to claim 11, wherein the cover comprises:
a closing part coupled to and closing the one end of the support frame; and
a covering part integrally formed with an outer surface of the closing part, and enclosing and protecting the connection piece of the substrate.

13. The stepping motor according to claim 12, wherein a plurality of coupling arms defined with engagement openings are formed on the outer surface of the closing part, and coupling projections are formed on a circumferential outer surface of the support frame to be inserted into and coupled to the engagement openings.

14. The stepping motor according to claim 13, wherein a support opening is defined through a center portion of the closing part in such a manner that the support pipe of the thrust plate can be inserted into and supported by the support opening.

15. The stepping motor according to any one of claim 1, wherein a plurality of fluctuation preventing projections are formed on the bracket and a plurality of fluctuation preventing holes are defined through the substrate in such a manner that the fluctuation preventing projections and the fluctuation preventing holes are coupled to each other to indicate coupling positions of the bracket and the substrate and prevent the substrate coupled to the bracket from fluctuating.

16. The stepping motor according to claim 15, wherein an elastic member is disposed between the cover and the thrust plate to elastically support the thrust plate toward the other end of the bracket.

* * * * *